Oct. 4, 1955  J. H. ORR  2,719,750
MOUNTING MEANS FOR A PIVOTED AUTOMOBILE WINDOW
Filed Aug. 2, 1952  2 Sheets-Sheet 1

INVENTOR
J. H. ORR
BY
Mawkinney & Mawkinney
ATTYS.

United States Patent Office 2,719,750
Patented Oct. 4, 1955

2,719,750

MOUNTING MEANS FOR A PIVOTED AUTOMOBILE WINDOW

John H. Orr, Coventry, England, assignor to Carbodies Limited, Coventry, England Application August 2, 1952, Serial No. 302,326

4 Claims. (Cl. 296—44)

The invention relates to the mounting of an elongated object (such as a bolt, stud, or pivot pin) on an anchorage so that it will extend substantially normally from a surface thereof.

The invention has for its object to provide means whereby the elongated object can be thus mounted on an anchorage when the space existing between the rear face of the anchorage and an adjacent part is insufficient for enabling the object to be inserted through a hole of the anchorage from behind the latter.

According to the invention, the object is supported in a hole (which may provide a close fit, or a loose fit to allow for adjustment) of the anchorage by a locking plate which is slidably held to and behind the anchorage so as to be movable from a position in which the larger end of a key-hole slot of the locking plate coincides with the hole of the anchorage for admitting the object, to a position in which the sides of the narrow portion of the key-hole slot engage a peripherally-grooved portion of the object, the plate having a portion, which extends clear of the anchorage so as to be accessible from the front of the latter, by which the plate can both be slid and held, when in locking position, by a screw coacting with a stationary part. Preferably the peripherally-grooved portion comprises opposed lateral grooves of the object, whereby to lock the latter against turning about its axis.

Figure 1:
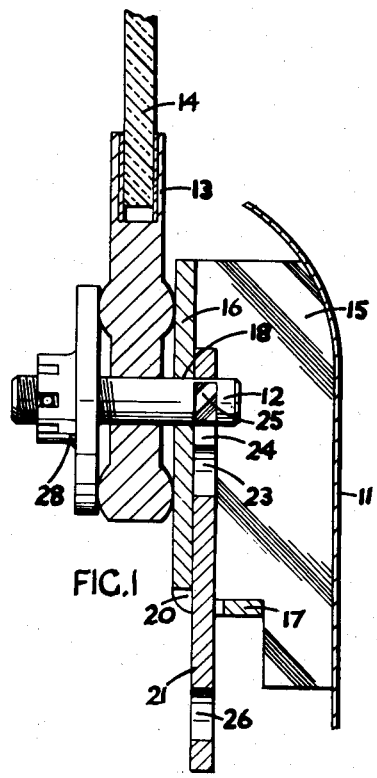
Figure 1 is a fragmentary sectional elevation of one form of mounting, for a quarter-light unit of a motor-vehicle, according to the invention, the section being taken on the line 1—1 of Figure 3.
Figure 2:
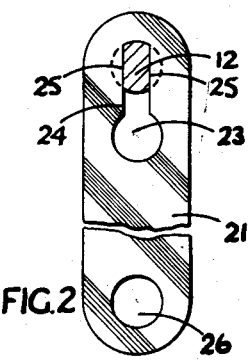
Figure 2 is a view of the locking plate.
Figure 3:
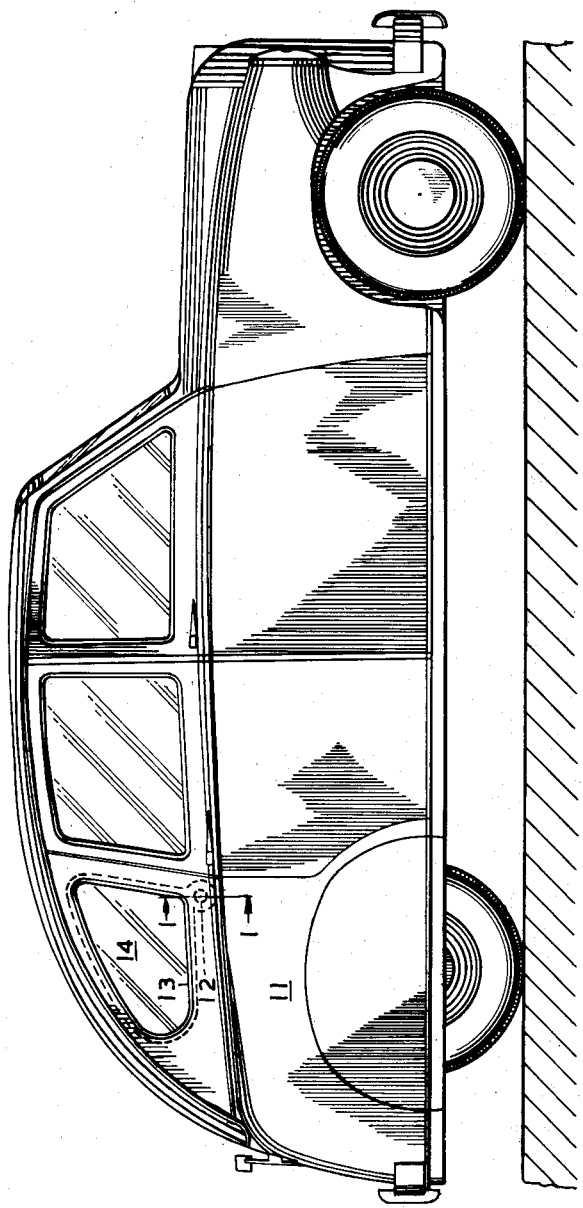
Figure 3 is a side elevation of a motor-car body with a quarter-light mounted in accordance with the invention.

The invention has particular application to the securing, to a motor-car body, of a pivot pin for supporting a quarter-light, there usually being very little space in that position for securing the pivot pin to the interior of the adjacent body panel or to a bracket fast therewith, particularly when the quarter-light is to be placed in position after some of the interior parts of the body have been installed (as is sometimes the case).

In the construction shown, for supporting within a motor-car body (part of which is indicated at 11) a pivot pin 12 for the frame 13 of a quarter-light 14, a sheet-metal bracket 15 is welded to the interior face of the body at an early stage of manufacture. The bracket has a portion 16 which is only slightly spaced (e. g., by one inch) from the adjacent part of the body 11, this portion having a flange 17 directed towards the body. The portion 16 of the bracket has a circular hole 18 of a diameter to receive the pivot pin, and there is a slot 20 in the bracket flange 17 in which a parallel-sided locking plate 21 can be slid in contact with the portion 16.

The locking plate has an inverted key-hole slot 23 of which the sides of the narrow portion 24 engage lateral grooves 25 of the pivot pin in the manner previously described. It also has a hole 26 to receive a tool (not shown) for sliding it, and afterwards a screw for locking it to a stationary part (also not shown).

The quarter-light is held on the pivot pin in any convenient manner, for example, by a nut 28 which has a threaded engagement with the pivot pin and which, by urging the quarter-light against the bracket, provides a desirable frictional restraint for the movement of the quarter-light. The nut also holds the locking plate firmly against the bracket for location purposes.

What I claim as my invention and desire to secure by Letters Patent of the United States is:

1. In combination, a panel of a motor car body, an anchor plate secured to the inside face of the panel and having a flange which is generally parallel to the adjacent portion of the panel and spaced only a short distance therefrom, a stud-like object mounted in a hole through the anchor plate with its main portion on the side of the anchor plate remote from said panel portion, the stud-like object having in it a peripheral groove on the panel side of the anchor plate, a window-frame supported on the main portion of the stud-like object, a nut on the stud-like object clamping the window-frame against the anchor plate, and a locating and locking plate for the stud-like object slidably carried by the anchor plate between the latter and said panel portion, the locking plate having a part extending clear of the anchor plate by means of which the locking plate can be slid, the locking plate also having a keyhole slot in it the large end of which can receive the free end of the stud-like object in one position of the locking plate, for assembly or dismantling, while the sides of the narrow portion of the keyhole slot can just engage the peripheral groove of the stud-like object in another position of the locking plate to provide axial location for the stud-like object.

2. In combination, a panel, an anchor plate secured to one face of the panel and having a flange which is generally parallel to the adjacent portion of the panel and spaced only a short distance therefrom, a stud-like object mounted in a hole through the flange with its adjacent end spaced from said panel portion and with its main portion on the side of the anchor plate remote from said panel portion, the stud-like object having in it lateral grooves on the panel side of the anchor plate, and a locating and locking plate for the stud-like object slidably carried by the anchor plate between the flange and said panel portion, the locking plate having a part extending clear of the anchor plate by means of which the locking plate can be slid, the locking plate also having a keyhole slot in it the large end of which can receive the free end of the stud-like object in one position of the locking plate, for assembly or dismantling, while the sides of the narrow portion of the keyhole slot can just engage the lateral grooves of the stud-like object in another position of the locking plate to provide axial location for the stud-like object.

3. The combination of claim 2, in which the lateral grooves of said stud-like object have opposed parallel walls to slidingly receive the narrow portion of the keyhole slot.

4. The combination of claim 2, in which the anchor plate also has a second flange extending from the first flange towards the panel, the locking plate being slidably guided by passing through a hole in said second flange.

References Cited in the file of this patent

UNITED STATES PATENTS

| | | |
|---|---|---|
| 631,523 | Hopper | Aug. 22, 1899 |
| 643,070 | Robinson | Feb. 6, 1900 |
| 1,064,262 | Utech | June 10, 1913 |
| 1,259,397 | Hathaway | Mar. 12, 1918 |
| 2,576,440 | Best | Nov. 27, 1951 |